P. MIRK.
THERMOSTATIC DEVICE.
APPLICATION FILED AUG. 18, 1921.
1,408,122. Patented Feb. 28, 1922.
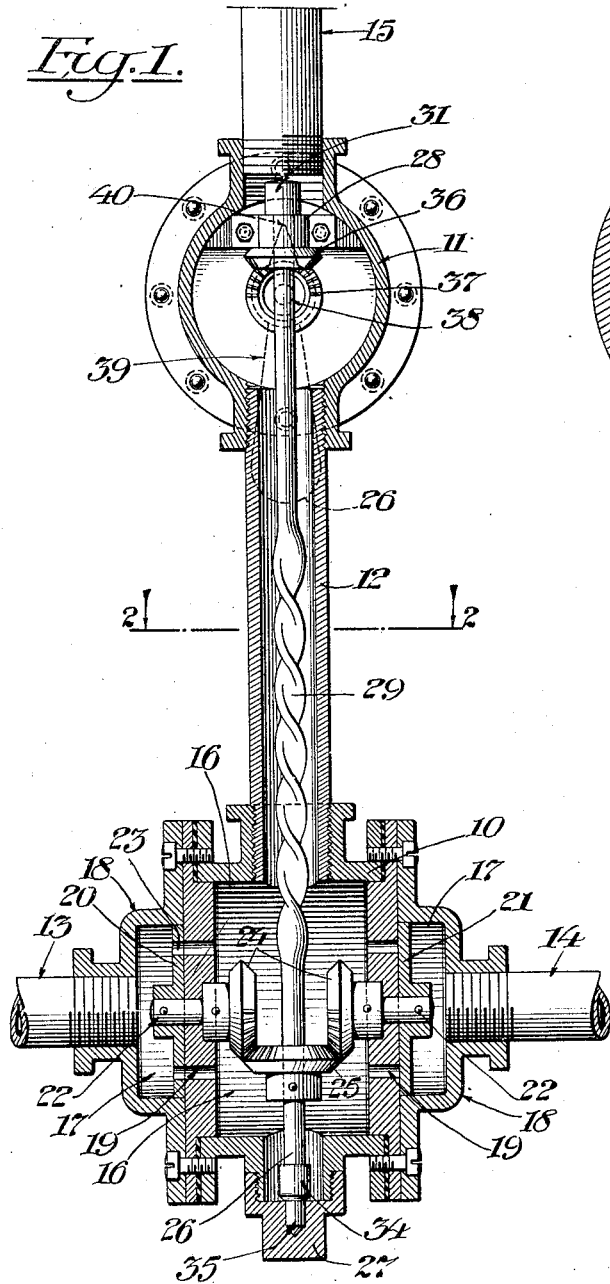
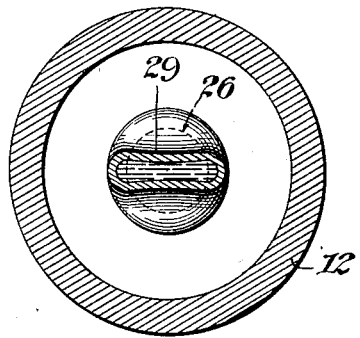
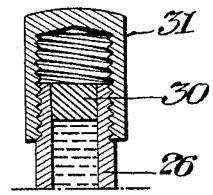
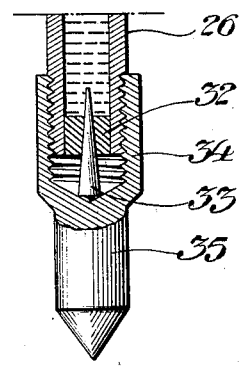
Inventor
Paul Mirk
by his Attorney
John R. Nolan

UNITED STATES PATENT OFFICE.

PAUL MIRK, OF NEW YORK, N. Y.

THERMOSTATIC DEVICE.

1,408,122.  Specification of Letters Patent.  Patented Feb. 28, 1922.

Original application filed November 16, 1920, Serial No. 424,437. Divided and this application filed August 18, 1921. Serial No. 493,296.

*To all whom it may concern:*

Be it known that I, PAUL MIRK, a citizen of the United States, and resident of the city of New York, in the county of New York and State of New York, have invented certain new and useful Improvements in Thermostatic Devices, of which the following is a specification.

This application is a division of my pending application Serial No. 424,437, filed November 16, 1920.

The object of the present invention is to provide a novel thermostatic device which is readily responsive to the influence of varying temperatures and which device has sufficient capacity, as to movement and force, to operate with certainty and positiveness a movable element controlled thereby.

According to my invention the thermostatic device comprises a tubular shaft flattened and formed with a drill twist, filled with an expansible liquid, and closed at its respective ends.

The invention also comprises features of construction which will be hereinafter described and claimed.

In the drawings—

Figure 1 is a vertical section, partly in elevation, of a water valve equipped with a thermostatic device embodying my invention.

Fig. 2 is a transverse section, enlarged, through the thermostatic device and its encasing tube, as on the line 2—2 of Fig. 1.

Figs. 3 and 4 are vertical sections through the upper and lower ends, respectively, of said device.

Referring to the drawings, 10, 11 designate two spaced-apart cylindrical casings connected by a tube 12. Two supply pipes 13, 14 for hot and cold water respectively, communicate with the interior of the casing 10, and an outlet pipe 15 communicates with the interior of the casing 11, whereby the water delivered into the casing 10 from either or both pipes 13, 14 flows up through the tube 12 into the casing 11 and thence escapes by way of the outlet pipe 15. The interior of the casing 10 thus constitutes a mixing chamber 16 for the hot and cold water supplied by the pipes 13, 14. In the present instance the connection between each of these pipes and the mixing chamber comprises a valve chamber 17 constituted by a flanged cup 18 secured to the adjacent head of the casing 10, said cup having a threaded neck to receive the end of the supply pipe, and said valve chamber having controllable communication with the mixing chamber through a circular series of spaced ports 19 in the adjacent head of the casing 10. The communication through the inlet ports 19 of the heads is effected by valves 20, 21, respectively, contained in the chambers 17, each of which valves preferably comprises a disk fast on a stud-shaft 22 having its bearing in the adjacent head of the casing 10. Each valve disk has a circular series of transverse ports 23 corresponding in number and position with the ports 19 and being adapted to be moved into or out of registry with the latter ports by the act of partially rotating the valve disk on its axis. The valves 20, 21 are so arranged in relation to each other and to the respective ports 19, that when one valve is in fully open position the other valve is in fully closed position. Hence by simultaneously turning the valves to a predetermined extent the communication of the respective pipes 13, 14 with the mixing chamber can be adjusted in order to permit the supply of hot and cold water to the mixing chamber in regulated proportions.

The stud-shafts 22 project into the mixing chamber and have fast on their inner ends mutilated bevel gears 24 (or sectors) with which meshes a similar gear 25 fast on a vertical shaft 26 of special construction, constituting my novel thermostatic device. This shaft, which extends longitudinally through and is encased by the tube 12, is stepped in a bearing 27 at the foot of the casing 10 and is journaled at its upper end in a bearing 28 within the casing 11, and hence when the shaft is partially rotated it effects through the gearing above described corresponding rotation of the valves 20, 21. The shaft 26 comprises a tube flattened and formed with a drill twist through a substantial portion of its length, as at 29, which tube is closed at its respective ends and is filled with a heavy expansible liquid having a high melting point, such, for example, as linseed or paraffin oil. If this shaft be fixedly held at its upper end and be subjected to the influence of varying temperatures the contained liquid will be caused to expand or contract to a greater or less extent according to the degree of heat, and the twisted portion of the shaft will have imparted thereto a rotary motion within a relatively large or small arc, to the right or left, which motion is, perforce, transmitted with great power through the lower end of the shaft to the gear 25 and thence through the gears 24 to the respective valves 20, 21.

In the present instance the upper end of the tubular thermostatic shaft is permanently closed by an imperforate plug 30 and screw cap 31 (Fig. 3), and the lower end of the shaft is provided with a centrally perforated plug 32 (Fig. 4) which, after the shaft is filled with liquid, is hermetically sealed by means of tapering pin 33. A cap member 34 having a cone-pointed stud 35 adapted to be seated in the socket bearing 27, is then screwed upon the lower end of the shaft so as to enclose the projecting end of the pin and lock it securely in place.

The shaft 26 has affixed thereto, within the upper casing 11, a mutilated bevel gear 36 (or sector) with which meshes a similar gear 37 on a stud-shaft 38 having its bearing in a wall of said casing. The outer end of the stud-shaft 38 is provided with a suitable handle 39, by the manipulation of which the stud-shaft 38 may be turned to a predetermined extent, to the right or to the left, and thus, through the gears 36, 37 effect a corresponding rotation of the thermostatic shaft 26 in order to set the valves 20, 21 for the influx to the mixing chamber of predetermined proportionate volumes of hot and cold water. Such water mixes in the chamber and flows up through the tube 12 and casing 11, to the pipe 15, whence it is discharged at the desired temperature.

So long as the predetermined temperature of the water delivered by the pipe 15 is maintained the condition of the thermostatic shaft 26 will be unaffected and the two valves will thus remain in their adjusted position, but if, for any reason, the water exceed a certain maximum temperature, say 105° F., caused, for example, by increased pressure of the inflowing hot water or by decreased pressure of the inflowing cold water to the mixing chamber, the increased heat to which the thermostatic shaft is subjected will cause the expansion of the liquid contained in the shaft and thus effect a partial rotation of the latter; thereby actuating the valves in such a manner as to reduce the flow of hot water and increase the flow of cold water to the mixing chamber. The temperature of the water flowing through the structure thus being naturally lowered the thermostatic shaft will automatically resume its normal or contracted condition and, perforce, the valves will be positively returned to their former relative positions as prescribed by the adjustment of the handle 39. If however, the flow of the cold water through the supply pipe 14 should be materially reduced from any cause, the hot water entering the chambered structure, if above the critical temperature, will act upon the thermal device to such an extent as to operate the valves sufficiently to shut off entirely the inlet ports for hot water and to open fully the inlet ports for the cold water.

While I have herein illustrated my novel thermostatic device as associated with a water valve, it is to be understood that the device may be advantageously used in other connections as a thermostatic regulator.

I claim—

1. A thermostatic device comprising a tubular shaft filled with an expansible liquid and closed at its respective ends, said shaft being flattened and formed with a drill twist, means whereby said shaft is fixedly held at one end, and means connected with the opposite end of the shaft and actuated by the rotary movement of the latter caused by the expansion or contraction of the contained liquid.

2. A thermostatic device comprising a tubular member filled with an expansible liquid and permanently closed at one end, a perforated plug in the opposite end of said member, a tapering pin sealing the perforation of the plug, and a separate screw cap on said opposite end enclosing the projecting end of the pin and locking it securely in place.

3. A thermostatic device comprising a tubular shaft filled with an expansible liquid, permanently closed at one end, a perforated plug in the opposite end of said shaft, a tapering pin sealing the perforation of the plug, and a screw cap on said opposite end encircling the projecting end of the pin and locking it in place, said shaft being flattened and formed with a drill twist in a substantial part of its length.

Signed at New York in the county and State of New York this 17th day of August, 1921.

PAUL MIRK.